US005762359A

United States Patent [19]
Webber et al.

[11] Patent Number: 5,762,359
[45] Date of Patent: Jun. 9, 1998

[54] AIR BAG MODULE AND STEERING WHEEL ASSEMBLY

[75] Inventors: James Lloyd Webber, Centerville; Robert Raymond Niederman, Dayton; Francis Joseph Holmes, Beavercreek, all of Ohio

[73] Assignee: General Motors Corporation, Detroit, Mich.

[21] Appl. No.: 725,149

[22] Filed: Oct. 2, 1996

[51] Int. Cl.⁶ .................................................. B60R 21/16
[52] U.S. Cl. ............................ 280/728.2; 280/731
[58] Field of Search ................... 280/728.2, 731, 280/732

[56] References Cited

U.S. PATENT DOCUMENTS

| | | | |
|---|---|---|---|
| 4,877,264 | 10/1989 | Cuevas | 280/731 |
| 4,989,897 | 2/1991 | Takada | 280/728.3 |
| 5,087,069 | 2/1992 | Corbett et al. | 280/731 |
| 5,141,247 | 8/1992 | Barth | 280/728.2 |
| 5,167,427 | 12/1992 | Baba | 280/728.3 |
| 5,186,492 | 2/1993 | Wright et al. | 280/728.2 |
| 5,201,541 | 4/1993 | Jones et al. | 280/731 |
| 5,207,544 | 5/1993 | Yamamoto et al. | 411/348 |
| 5,259,641 | 11/1993 | Schenk et al. | 280/731 |
| 5,280,946 | 1/1994 | Adams et al. | 280/728.2 |
| 5,312,129 | 5/1994 | Ogawa | 280/728.2 |
| 5,320,379 | 6/1994 | Burnard et al. | 280/728.2 |
| 5,333,897 | 8/1994 | Landis et al. | 280/728.2 |
| 5,350,190 | 9/1994 | Szigethy | 280/728.2 |
| 5,354,093 | 10/1994 | Schenck et al. | 280/728.3 |
| 5,380,037 | 1/1995 | Worrell et al. | 280/728.3 |
| 5,388,858 | 2/1995 | Cuevas | 280/728.2 |
| 5,409,256 | 4/1995 | Gordon et al. | 280/728.2 |
| 5,470,099 | 11/1995 | Williams | 280/728.2 |
| 5,470,100 | 11/1995 | Gordon | 200/728.2 |
| 5,496,057 | 3/1996 | Niederman | 280/728.2 |
| 5,505,483 | 4/1996 | Taguchi et al. | 280/728.2 |
| 5,505,488 | 4/1996 | Allard | 280/740 |
| 5,556,125 | 9/1996 | Ricks et al. | 280/728.2 |
| 5,577,768 | 11/1996 | Taguchi et al. | 280/728.2 |
| 5,636,858 | 6/1997 | Niederman et al. | 280/728.2 |

FOREIGN PATENT DOCUMENTS 131886  5/1993  Japan .

*Primary Examiner*—Kenneth R. Rice
*Attorney, Agent, or Firm*—Kathryn A. Marra

[57] ABSTRACT

An air bag module and steering wheel assembly includes an air bag module and a steering wheel. The air bag module includes a base plate, an air bag attached to the base plate, and a cover having downwardly extending side walls loosely connected to the base plate while leaving the cover free for manual removal from the base plate, yet being sufficiently sturdy for transporting and storing of the module. The steering wheel includes an upstanding capture plate forming a vertically extending wall surrounding a receiving area. The capture plate engages the side walls of the cover when the module is inserted into the receiving area and captures the side walls of the cover between the base plate and the capture plate such that the cover is anchored to the base plate for withstanding the forces of air bag inflation.

17 Claims, 3 Drawing Sheets

AIR BAG MODULE AND STEERING WHEEL ASSEMBLY

This invention relates to an air bag module and steering wheel assembly having an air bag module cover secured to the module without the use of fasteners.

BACKGROUND OF THE INVENTION

It is well known in motor vehicles to provide an air bag module mounted to a steering wheel. A typical driver's side air bag module includes a generally circular inflator positioned partially within a bag opening of an air bag for discharging inflator gas to inflate the air bag upon sensing certain predetermined vehicle conditions. The undeployed air bag is folded atop the inflator and a module cover overlies the air bag, inflator and other module components.

The air bag module is formed as a separate and independent unit from the steering wheel. The cover, air bag, and inflator are each securely anchored to a base plate of the module such that inflation forces can be withstood. In addition, the module typically includes a plurality of axially elongated mounting members extending downwardly from the base plate for connecting the module to a mounting portion of a steering wheel.

The cover of the air bag module overlies the air bag, inflator and other module components to form an aesthetically pleasing cover which is durable for normal vehicle use. The cover commonly has tear lines or weakened portions that allow the cover to open during air bag inflation. It is known to connect the cover of the air bag module to the base plate by a plurality of fasteners, such as rivets or screws. The use of multiple fasteners increases assembly time.

The prior art has also suggested attachment of the cover by the use of mating overlapping tabs on each of the cover and base plate. However, assembly is still difficult since the tabs on the base plate are rigid metal which must be bent or crimped into place. The suggestion has also been made to form tabs on the cover with inwardly and upwardly turned J-shaped hooks on the tabs which are inserted into mating holes in the base plate. However, the hooks on the tabs are not sufficiently thick to securely maintain the cover to the base plate during inflation since the hooks must be thin enough to be inserted through the holes during assembly. Since the hooks do not tightly fit in the holes, they are free to pull out of the holes under the forces of air bag inflation. Thus, the prior art has taught adding additional components to the module such as a snap-in-place ring that acts as a spacer to fill the holes to prevent removal of the hooks from the holes during air bag inflation.

SUMMARY OF THE INVENTION

The present invention provides a cover which is easily attached to the module without the use of fasteners. Advantageously, the cover is initially loosely secured to the module and then securely anchored to the module by utilizing the structure of the steering wheel. Advantageously, the cover is anchored to the module without the use of fasteners and without the use of separate components that must be handled and manipulated with the module. Advantageously, the cover is easily anchored to the module simply by the unidirectional attachment of the module to the steering wheel which greatly eases assembly over the prior art. Also advantageously, the present invention preferably enables easy initial loose attachment of the cover to the base plate which is sufficiently strong for storage and transport prior to installation on the steering wheel. Advantageously, unidirectional attachment of the module to the steering wheel also simultaneously securely anchors the cover to the module. Also advantageously, removal of the cover for servicing can easily be accomplished without damaging the cover when the module is removed from the steering wheel. In addition, the cover is aesthetically pleasing and has structure which hides the attachment locations on the cover from view such that they cannot be detected by the vehicle occupants when the module is assembled to the steering wheel.

These advantages are accomplished in the present invention by providing an air bag module and steering wheel assembly including an air bag module and a steering wheel. The air bag module includes a base plate, an air bag attached to the base plate, and a cover having downwardly extending side walls loosely connected to the base plate while leaving the cover free for manual removal from the base plate, yet being sufficiently sturdy for transporting and storing of the module. The steering wheel includes a receiving area into which the module is inserted for attachment to the steering wheel. The steering wheel further includes an upstanding capture plate forming a vertically extending wall surrounding the receiving area. The capture plate engages the side walls of the cover when the module is inserted into the receiving area and captures the side walls of the cover between the base plate and the capture plate such that the cover is anchored to the base plate for withstanding the forces of air bag inflation. Preferably, the capture plate is a single continuous plate surrounding the receiving area of the steering wheel. Preferably, the module is unidirectionally inserted into the receiving area of the steering wheel and the vertically extending walls of the capture plate are parallel to the insertion direction of the module into the receiving area of the steering wheel.

According to other preferred aspects of the invention, the steering wheel preferably includes a mounting portion to which the module is mounted. The capture plate may be integrally formed with the mounting portion of the steering wheel and preferably extends generally perpendicular thereto. Also preferably, the steering wheel includes spaced apart spoke portions extending radially outward from the capture plate and the cover includes a downwardly extending outer cover flange spaced radially outward from the side walls of the cover. The outer cover flange extends between the spoke portions and covers the capture plate when the module is mounted in the receiving area of the steering wheel.

Preferably, the side walls of the cover include a plurality of inwardly projecting bosses thereon and the base plate includes a vertically extending flange having apertures therein for receiving the bosses of the cover therein to loosely connect the cover to the base plate. Upon insertion of the module into the receiving area of the steering wheel, the side walls engage and are trapped between the flange of the base plate and the capture plate of the steering wheel and the bosses are trapped in the apertures to anchor the cover to the base plate during air bag deployment. Preferably, the bosses are planar and extend perpendicular to the side walls of the cover. Also preferably, the side walls of the cover include a plurality of downwardly extending tab portions each having an inwardly projecting boss thereon and the base plate includes a vertically extending flange having apertures therein for receiving the bosses of the cover therein to loosely connect the cover to the base plate. Upon insertion of the module into the receiving area of the steering wheel, the tab portions are trapped between the flange of the base plate and the vertically extending wall of the capture plate and the tab portions are prevented from outward movement and the bosses are trapped in the apertures to anchor the cover to the base plate during air bag deployment.

In accordance with yet another preferred aspect of this invention, a method of assembling an air bag module and steering wheel assembly includes the steps of providing an air bag module including a base plate having a vertically extending flange portion having a plurality of apertures therein; providing a cover of the module having vertically extending side walls including a plurality of inwardly projecting bosses thereon; pulling the cover over the base plate and inserting the bosses into the apertures to loosely connect the cover to the base plate for transport and storage while leaving the cover free for removal from the base plate; providing a steering wheel including a receiving area for receiving the module therein and the steering wheel having capture plate including an upstanding vertical wall surrounding the receiving area; and inserting the module into the receiving area such that the vertical wall engages the side walls of the cover and simultaneously capturing the side walls of the cover between the base plate and the vertical wall of the steering wheel such that the cover is anchored to the base plate for withstanding the forces of air bag inflation and such that the bosses are securely trapped in the apertures of the base plate.

Thus, the present invention is characterized by providing simplicity, ease of assembly and disassembly, and reduction of parts and assembly time for securing the cover to the air bag module and steering wheel assembly.

BRIEF DESCRIPTION OF THE DRAWINGS

The present invention will flow be described, by way of example, with reference to the accompanying drawings, in which.

DESCRIPTION OF THE PREFERRED EMBODIMENT

Figure 1:
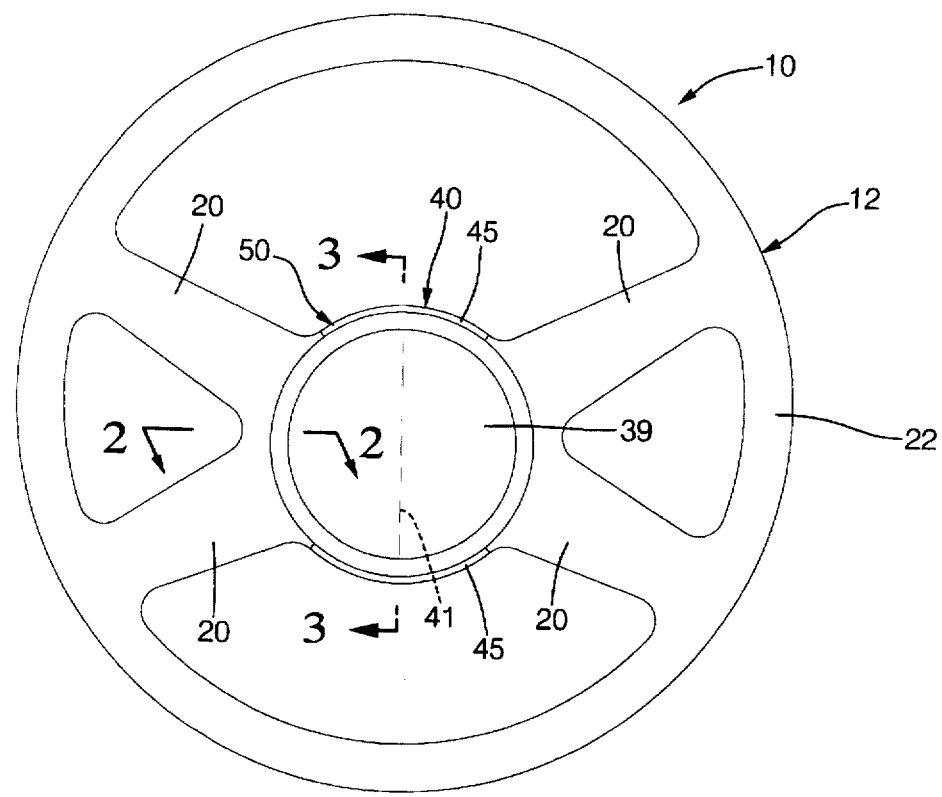
FIG. 1 is front plan view of an air bag module and steering wheel assembly in the fully assembled condition.
Figure 2:
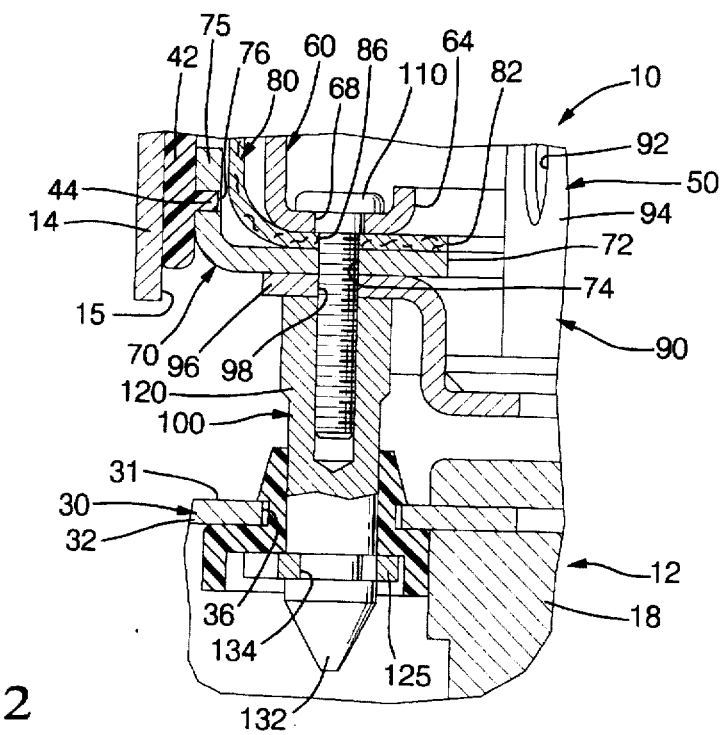
FIG. 2 is a sectional view taken along line 2—2 of FIG. 1.
Figure 3:
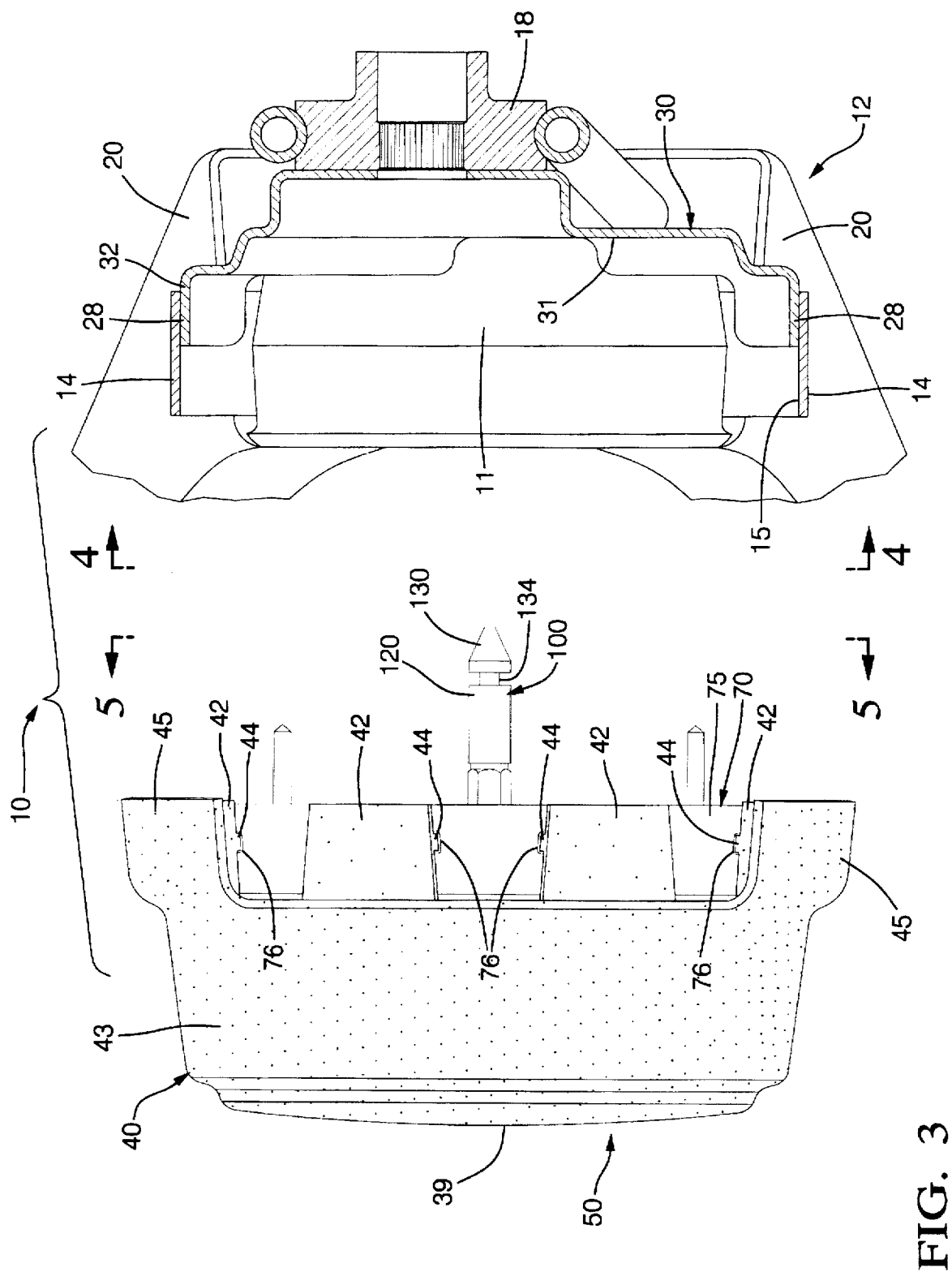
FIG. 3 is an exploded view of the air bag module and steering wheel assembly showing a side view of the air bag module and showing a cross-sectional view of the steering wheel with the spoke portions partially broken-away.
Figure 4:
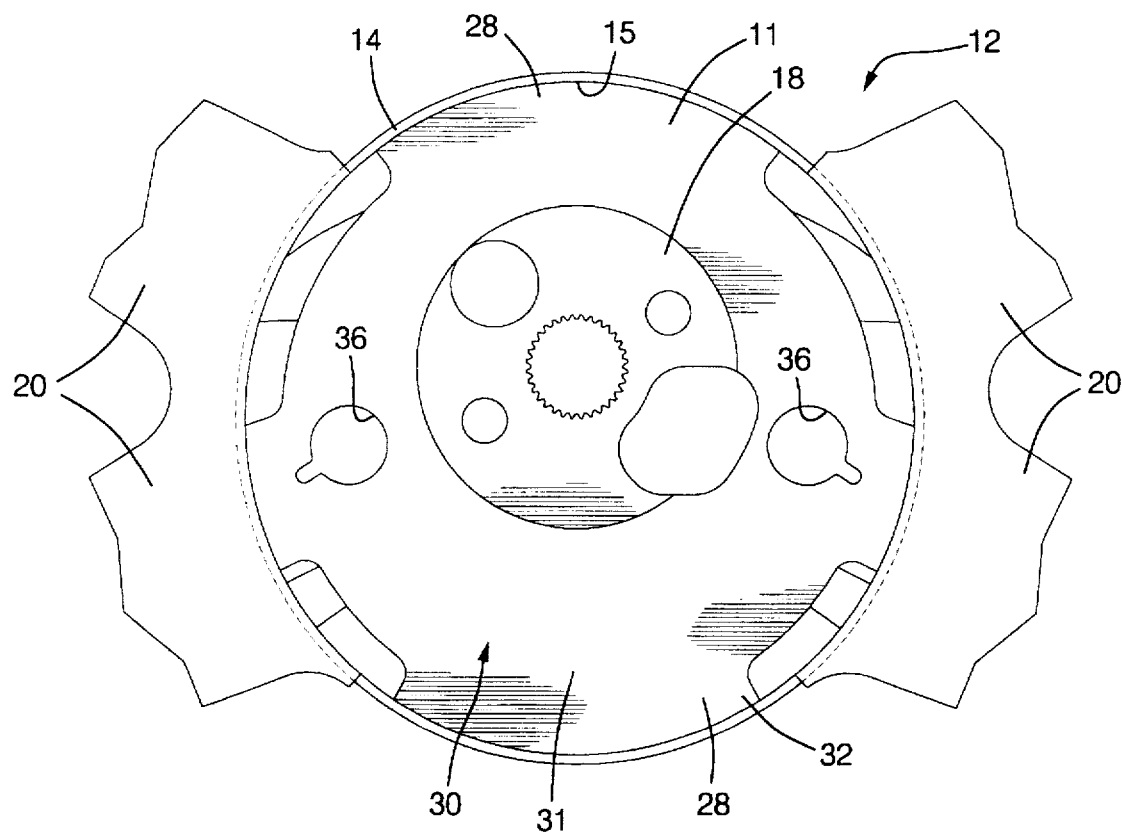
FIG. 4 is a top plan view of the steering wheel with the spoke portions partially-broken-away.

Referring to FIGS. 1 and 2, a vehicle includes an air bag module and steering wheel assembly, generally designated as 10, including a steering wheel 12 for mounting on a steering column (not shown) and an air bag module 50 mounted on the steering wheel 12. As best shown in FIGS. 1, 3 and 4, the steering wheel 12 includes a mounting portion 30 attached to a central hub portion 18 and outwardly extending spoke portions 20. An outer circular rim portion 22 is connected to the central hub portion 18 by the spoke portions 20. As best shown in FIG. 4, the steering wheel 12 has an open receiving area 11 for receiving the air bag module 50 therein. The air bag module 50 is inserted within the receiving area 11 and mounted to the mounting portion 30 of the steering wheel 12.

The mounting portion 30 is preferably made of a sturdy material, such as metal, and is preferably welded to or integrally molded with the hub portion 18 and spoke portions 20 of the steering wheel 12. The mounting portion 30 preferably has a generally planar mounting surface 31 and has a generally circular shape. However, many other shapes are possible for the mounting portion 30, such as rectangular, triangular or any other suitable geometric shape which complements the shape of the air bag module 50. As best shown in FIG. 3, the mounting portion 30 has perimetral side edges 32 that are shown as having upturned portions 28, but which alternately may be downturned or simply flat. As shown in FIG. 4, the mounting portion 30 includes a plurality of mounting apertures 36 for attachment of the air bag module 50, as described further hereinafter.

As best shown in FIGS. 2, 3 and 4, the steering wheel 12 further includes a capture plate 14 which is attached to the side edges 32 of the mounting portion 30, such as by welding. The capture plate 14 is preferably a single continuous ring having the same geometric shape as the side edges 32 of the mounting portion 30 for ease of attachment thereto. The capture plate 14 is preferably made of a rigid sturdy material, such as metal. The capture plate 14 preferably extends generally perpendicular to the mounting portion 30 and is generally vertically extending relative the steering wheel 12 for ease of insertion of the module 50 into the receiving area 11 of the steering wheel 12, as described further hereinafter. The capture plate 14 provides an upstanding, vertically extending wall 15 surrounding the receiving area 11 and mounting portion 30 of the steering wheel 12. The capture plate 14 preferably extends generally perpendicular to the mounting portion 30. It will be appreciated that the capture plate 14 may be attached to the mounting portion 30 of the steering wheel 12 such that the invention can be adapted for use with any steering wheel having a mounting portion 30. The capture plate 14 is preferably continuous for increased strength to withstand the forces during air bag deployment. However, it will also be appreciated that the capture plate 14 could be integrally formed with the mounting portion 30 such that the capture plate 14 provides the integral upstanding, vertically extending wall 15 around the mounting portion 30, and thus is not separately attached to the mounting portion 30. For example, the mounting portion 30 could be made of a cast or molded material, such as magnesium or plastic, and the capture plate 14 could be integrally formed with the mounting portion 30 during manufacturing for nominal cost. It will further be appreciated that the capture plate 14 could also be formed of multiple upstanding, vertically extending pieces attached to the mounting portion 30 of the steering wheel 12, which may be desirable to decrease sensitivity to tolerances when attaching the capture plate 14 to the mounting portion 30. It will also be appreciated that the capture plate 14, rim portion 22, mounting portion 30 and spoke portions 20 preferably have outer surfaces covered with a layer of foam or other plastic material for an aesthetically pleasing appearance.

As best shown in FIG. 2, the component parts of the air bag module 50 include a base plate 70, a cover 40, an air bag retainer 60, an air bag 80, an inflator 90, and fastener mechanisms 100 for retaining and mounting the module 50 including first and second mounting members 110, 120, respectively. Advantageously, the cover 40 is secured to the base plate 70 without the use of fasteners simply by unidirectional insertion of the module 50 into the receiving area 11 of the steering wheel 12 whereby the cover 40 is secured to the module 50 by interaction with the capture plate 14 on the steering wheel 12, as described in detail below. The air bag 80, air bag retainer 60, and inflator 90 are each connected to the base plate 70 and then mounted to the steering wheel 12 by cooperation of the first and second mounting members 110, 120, as described further hereinafter.

Referring to FIG. 2, the air bag 80 may be of a conventional construction and material. The air bag 80 includes a central air bag opening 82 for receiving inflator gas therein to inflate the air bag 80. The air bag 80 includes a plurality of air bag apertures 86 which are circumferentially spaced apart around the air bag opening 82. An air bag retainer 60 is located within the air bag 80 adjacent the air bag opening 82 for supporting and anchoring the air bag 80 during inflation. The air bag retainer 60 is preferably metallic and includes a central gas opening 64 for receiving the inflator 90 partially therethrough. The air bag retainer 60 includes a plurality of air bag retainer apertures 68 circumferentially spaced for alignment with the air bag apertures 86.

As shown in FIG. 2, the module 50 includes the inflator 90 for generating gas to inflate the air bag 80 when the inflator 90 receives a predetermined signal from a vehicle sensor, not shown. The inflator 90 has a generally circular shape and may be of a conventional construction for discharging gas such as through ports 92 in a main body 94 to inflate the air bag 80. The main body 94 of the inflator 90 is located partially within the air bag opening 82 and partially extends through the central gas opening 64 of the air bag retainer 60. The inflator 90 further includes a peripheral radially outwardly extending inflator flange 96 which may be integral with the inflator 90 or attached to the main body 94, such as by welding or fastening. The inflator flange 96 includes a plurality of inflator flange apertures 98 circumferentially spaced for axial alignment with the air bag apertures 86 and the air bag retainer apertures 68.

Referring to FIGS. 2, the base plate 70 is preferably metallic and includes a central circular plate opening 72 sized slightly larger than the main body 94 of the inflator 90 and sized for alignment with the central gas opening 64 of the air bag retainer 60. The base plate 70 includes a plurality of base plate apertures 74 circumferentially spaced for alignment with respective air bag apertures 86, air bag retainer apertures 68, and inflator flange apertures 98. A perimeter of the base plate 70 includes an upturned, vertically extending flange portion 75 having boss apertures 76 circumferentially spaced apart for alignment with bosses 44 on tab portions 42 of the cover 40, as described further hereinafter. The boss apertures 76 are preferably sized for closely receiving the bosses 44 on the cover 40 therein such that the cover 40 is initially loosely attached to the base plate 70 while leaving the cover 40 free for manual removal from the base plate 70. Advantageously, the cover 40 is loosely attached to the base plate 70 such that the cover 40 is attached securely enough for transport and storage of the module 50, but not tightly enough to withstand the forces of air bag inflation.

Figure 5:
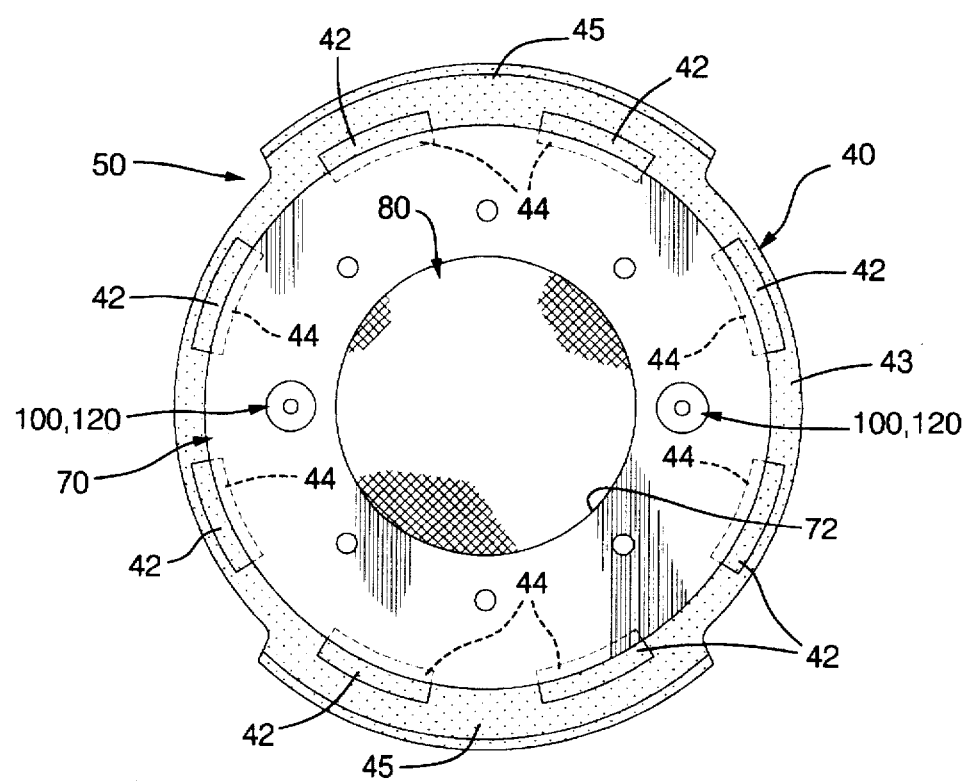
FIG. 5 is a plan view of the air bag module with a cover loosely connected to the base plate and showing the underside of the cover and base plate, but not showing the inflator for clarity.

Referring to FIGS. 1, 3 and 5, the cover 40 is preferably integrally molded from a suitable plastic material and serves as an aesthetically pleasing covering for the other components of the module 50. The cover 40 has an upper surface 39 which preferably includes tear lines or weakened portions 41 shown in FIG. 1 that allow the cover 76 to open during air bag 80 inflation. As best shown in FIGS. 2 and 3, the cover 40 further includes downward, vertically extending side walls 43 which cooperatively form a container shaped for closely holding the air bag 80 in the folded condition. The side walls 43 of the cover 40 preferably include downward, vertically extending tab portions 42 which are circumferentially spaced apart around the side walls 43.

Preferably, the tab portions 42 are outwardly flexible for ease of assembling the cover 40 to the base plate 70. It will be appreciated that there could be more or fewer tabs portions 42 on the cover 40 than are shown in the preferred embodiment. For example, a single continuous tab portion 42 could extend downwardly from the side walls 43 of the cover 40. The tab portions 42 each preferably include at least one inwardly projecting boss 44 integrally formed thereon. The bosses 44 preferably extend at right angles to the tab portions 42 and have a generally planar shape. The bosses 44 on the tab portions 42 are circumferentially spaced apart around the side walls 43 of the cover 40 for alignment with the boss apertures 76 on the base plate 70 for slip-fitted attachment therein during initial manual loose connection of the cover 40 to the base plate 70.

The cover 40 further includes outer cover flanges 45 which extend radially outward and vertically downward from selected portions of the side walls 43 of the cover 40. Thus, as best shown in FIGS. 3 and 5, the outer cover flanges 45 are spaced radially outward from the tab portions 42. The outer cover flanges 45 extend radially outwardly from the capture plate 14 and vertically downward such that they are long enough to cover the capture plate 14 on the steering wheel 12 and the tab portions 42 when the module 50 is attached to the steering wheel 12. As best shown in FIG. 1, the outer cover flanges 45 are positioned on the cover 40 for alignment and radial extension between the spoke portions 20 of the steering wheel 12 when the module 50 is attached to the steering wheel 12. Thus, the outer cover flanges 45 provide an aesthetically pleasing appearance to the air bag module and steering wheel assembly 10 by advantageously covering the capture plate 14 and tab portions 42 and extending between the spoke portions 20 for providing a smooth appearance to the assembly 10.

The module 50 is assembled separate and independent from the steering wheel 12 as follows. As shown in FIG. 2, the fastener mechanisms 100 are used to connect the module components to the base plate 70, except for the cover 50, and also for mounting the module 50 to the steering wheel 12. The fastener mechanisms 100 include first mounting members 110 rigidly connected to the air bag retainer 60 and second mounting members 120 threadably engaging the first mounting members 110. The air bag retainer 60, the air bag 80, the base plate 70 and inflator 90 are each connected to each other simply by screwing the second mounting members 120 to the first mounting members 110. The first and second mounting members 110, 120 enable facile assembly and disassembly of the air bag retainer 60, air bag 80, base plate 70 and inflator 90 to each other and also enable facile assembly and disassembly of the module 50 to the mounting portion 30 of the steering wheel 12, as described below.

The cover 40 is preferably added to the module 50 after the air bag 80 is folded to maintain the air bag 80 in the folded condition. The cover 40 is easily initially loosely connected by manual operation to the base plate 70 such that the cover 40 is free for manual removal from the base plate 70 as follows. The bosses 44 on the tab portions 42 are aligned with the boss apertures 76 on the base plate 70 and the bosses 44 are each slip-fittedly inserted into the boss apertures 76. Preferably, the cover 40 may be placed upside down while the air bag 80 and air bag retainer 60 are inserted in the cover 40 and while the cover 40 is attached to the base plate 70. It will be appreciated that the inflator 90 may be secured to the base plate 70 either before or after attachment of the cover 40. The tab portions 42 of the cover 40 are preferably resilient such that they can be flexed radially outward to receive the base plate 70 therebetween and then flex radially inward such that the bosses 44 are slip-fittedly inserted into the boss apertures 76. When the bosses 44 are seated in the boss apertures 76, the cover 40 is sufficiently loosely connected to the base plate 70 such that the module 50 can be transported or stored until it is secured to the mounting portion 30 of the steering wheel 12. The cover 40 being loosely connected to the base plate 70 is free for manual removal from the base plate 70. It will be appreciated that the bosses 44 are preferably straight inwardly projecting planar bosses 44 and are not hook-shaped, such that they easily can be slipped into the boss apertures 76 on the base plate 70. Thus, the bosses 44 are easy to insert into the boss apertures 76 during assembly. This is possible since the cover 40 need only be initially loosely connected to the base plate 70 for transport and storage of the module 50, but not sufficiently connected to withstand the forces of air bag inflation. Advantageously, this is possible since unidirectional insertion of the module 50 into the receiving area 11 of the steering wheel 12 simultaneously anchors the cover 40 to the base plate 70 by the capture plate 14 trapping the tab portions 42, as described below.

The second mounting members 120 are adapted for releasable connection to the mounting portion 30 for mounting the module 50 to the steering wheel 12 while simultaneously securing the cover 40 to the base plate 70, as will now be described. The lower portions of the second mounting members 120 extend downwardly towards the mounting portion 30 of the steering wheel 12 and include tapered distal ends 132 having an annular groove 134 thereon. The distal ends 132 of the second mounting members 120 are spaced for matable alignment with the mounting apertures 36 on the mounting portion 30 for insertion through the mounting apertures 36 to securely connect the module 50 to the mounting portion 30 and to simultaneously anchor the cover 40 to the base plate 70. The mounting portion 30 carries springs 125 which resiliently snap into the annular grooves 134 to securely connect the module 50 to the steering wheel 12 by snap-fitted attachment to provide the air bag module and steering wheel assembly 10. When the entire air bag module 50, and thus the second mounting members 120 are moved unidirectionally in a downward direction towards the mounting portion 30 and through the mounting apertures 36, the springs 125 will move laterally outward until they are aligned with the annular grooves 134 in the distal ends 132, at which time the springs 125 will move laterally inward into latching engagement with the grooves 134. Once the springs 125 are engaged with the grooves 134 of the second mounting members 120, the entire module 50 is securely attached to the mounting portion 30 of the steering wheel 12.

Advantageously, when the module 50 is unidirectionally inserted into the receiving area 11 and attached to the mounting portion 30 of the steering wheel 12, the tab portions 42 of the cover 40 are simultaneously captured and securely trapped between the vertically extending flange portion 75 of the base plate 70 and the vertically extending wall 15 of the capture plate 14 of the steering wheel 12. Since the tab portions 42 are trapped, the bosses 44 are also trapped within the boss apertures 76 of the base plate 70. Thus, the cover 40 is securely anchored to the assembly 10 without the use of fasteners. Instead, the mating engagement of the base plate 70 of the module 50 with the upstanding capture plate 14 of the steering wheel 12 securely anchors the cover 40 to the base plate 70 such that the cover 40 is anchored to the assembly 10 for withstanding the forces of air bag inflation.

Disassembly of the air bag module 50 from the mounting portion 30 is easily accomplished as follows. A suitable tool, such as flat blade screwdriver (not shown), may be inserted through access openings (not shown) provided in steering wheel 12 wherein the screwdriver biases the springs 125 laterally outward such that the springs 170 pop out of engagement with the grooves 134 in the second mounting members 120. In this manner, after the springs 125 are released, the module 50 can be pulled forward and away from the mounting portion 30 such that the tab portions 42 are easily released from the capture plate 14 by unidirectional removal. Once the module 50 is removed from the steering wheel 12 and the capture plate 14 no longer secures the tab portions 42, the bosses 44 can be pulled radially outward, out of engagement with the boss apertures 76 to remove the cover 40 to service the underlying components, such as an underlying horn switch (not shown), without damage to the cover 40 which can then be reused.

Upon actuation, the inflator 90 discharges inflator gas. The ports 92 of the inflator 90 direct the discharging inflator gas upwardly to inflate the air bag 80 which will deploy out through the weakened portions 41 of the cover 76. During the application of the forces associated with the discharge of inflator gas, the vertically extending wall 15 of the upstanding capture plate 14 on the steering wheel 12 traps the bosses 44 in the boss apertures 76 of the base plate 70 to securely anchor the cover 40 to the base plate 70 without the use of fasteners.

It will be understood that a person skilled in the art may make modifications to the preferred embodiment shown herein within the scope and intent of the claims.

While the present invention has been described as carried out in a specific embodiment thereof, it is not intended to be limited thereby but is intended to cover the invention broadly within the scope and spirit of the appended claims.

What is claimed is:

1. An air bag module and steering wheel assembly comprising:
   an air bag module including
      a base plate,
      an air bag attached to the base plate, and
      a cover having downwardly extending side walls loosely connected to the base plate while leaving the cover free for manual removal from the base plate; and
   a steering wheel having
      a receiving area for receiving the module therein for attachment to the steering wheel, and
      an upstanding capture plate forming a vertically extending wall surrounding the receiving area, the capture plate engaging the side walls of the cover when the module is inserted into the receiving area and capturing the side walls of the cover between the base plate and the capture plate such that the cover is anchored to the base plate for withstanding the forces of air bag inflation.

2. The assembly of claim 1 wherein the capture plate is a single continuous plate surrounding the receiving area of the steering wheel.

3. The assembly of claim 1 wherein the steering wheel includes a mounting portion to which the module is mounted and wherein the capture plate is integrally formed with the mounting portion of the steering wheel.

4. The assembly of claim 3 wherein the vertically extending wall of the capture plate extends generally perpendicular to the mounting portion.

5. The assembly of claim 1 wherein the module is unidirectionally inserted into the receiving area of the steering wheel and wherein the vertically extending wall of the capture plate is parallel to the insertion direction of the module into the receiving area of the steering wheel.

6. The assembly of claim 1 wherein the steering wheel includes spaced apart spoke portions extending radially outward from the capture plate and wherein the cover includes a downwardly extending outer cover flange spaced radially outward from the side walls of the cover and wherein the outer cover flange extends between the spoke portions and covers the capture plate when the module is mounted in the receiving area of the steering wheel.

7. The assembly of claim 1 wherein the side walls of the cover include a plurality of inwardly projecting bosses thereon and wherein the base plate includes a vertically extending flange having apertures therein for receiving the bosses of the cover therein to loosely connect the cover to the base plate and whereby upon insertion of the module into the receiving area of the steering wheel, the side walls engage and are trapped between the flange of the base plate and the capture plate of the steering wheel and the bosses are trapped in the apertures to anchor the cover to the base plate during air bag deployment.

8. The assembly of claim 7 wherein the bosses are planar and extend perpendicular to the side walls of the cover.

9. The assembly of claim 1 wherein the side walls of the cover include a plurality of downwardly extending tab portions each having an inwardly projecting boss thereon and wherein the base plate includes a vertically extending flange having apertures therein for receiving the bosses of the cover therein to loosely connect the cover to the base plate and whereby upon insertion of the module into the receiving area of the steering wheel, the tab portions are trapped between the flange of the base plate and the vertically extending wall of the capture plate and wherein the tab portions are prevented from outward movement and wherein the bosses are trapped in the apertures to anchor the cover to the base plate during air bag deployment.

10. The assembly of claim 9 wherein the bosses are planar and extend perpendicular to the side walls of the cover.

11. An air bag module and steering wheel assembly comprising:
    an air bag module including
        an base plate having a vertically extending flange having apertures therein,
        an air bag attached to the base plate,
        mounting members extending downwardly from the base plate, and
        a cover having vertically extending side walls including downwardly extending tab portions, each of the tab portions including an inwardly projecting boss thereon, the bosses being seated within the apertures of the base plate to loosely connect the cover to the base plate while leaving the cover free for manual removal from the base plate; and
    a steering wheel including
        a generally planar mounting portion for receiving the mounting members therein to securely connect the module to the steering wheel, the mounting portion having side edges, and
        an upstanding capture plate extending upwardly from the side edges of the mounting portion, the capture plate engaging the tab portions of the cover when the mounting members of the module are connected to the mounting portion and capturing the tab portions between the flange of the base plate and the capture plate to restrain the tab portions from outward movement and to securely trap the bosses in the apertures of the base plate such that the cover is anchored to the base plate for withstanding the forces of air bag inflation.

12. The assembly of claim 11 wherein the capture plate is a single continuous plate surrounding the mounting portion of the steering wheel.

13. The assembly of claim 11 wherein the capture plate is integrally formed with the mounting portion of the steering wheel.

14. The assembly of claim 11 wherein the capture plate extends generally perpendicular to the mounting portion.

15. The assembly of claim 11 wherein the steering wheel includes spaced apart spoke portions extending radially outward from the capture plate and wherein the cover includes a downwardly extending outer cover flange spaced radially outward from the side walls of the cover and wherein the outer cover flange extends between the spoke portions and covers the capture plate and the tab portions when the module is mounted on the mounting portion of the steering wheel.

16. The assembly of claim I wherein the bosses are planar and extend perpendicular to the side walls of the cover.

17. A method of assembling an air bag module and steering wheel assembly, the method comprising the steps of:

providing an air bag module including a base plate having a vertically extending flange having a plurality of apertures therein;

providing a cover of the module having vertically extending side walls including a plurality of inwardly projecting bosses thereon;

pulling the cover over the base plate and inserting the bosses into the apertures to loosely connect the cover to the base plate for transport and storage while leaving the cover free for removal from the base plate;

providing a steering wheel including a receiving area for receiving the module therein and the steering wheel having capture plate including an upstanding vertical wall surrounding the receiving area; and inserting the module into the receiving area such that the vertical wall engages the side walls of the cover and simultaneously capturing the side walls of the cover between the base plate and the vertical wall of the steering wheel such that the cover is anchored to the base plate for withstanding the forces of air bag inflation and such that the bosses are securely trapped in the apertures of the base plate.

* * * * *